(12) United States Patent
Safai

(10) Patent No.: US 11,112,370 B2
(45) Date of Patent: Sep. 7, 2021

(54) RECONFIGURABLE BACKSCATTER DETECTOR

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 211 days.

(21) Appl. No.: 16/240,613

(22) Filed: Jan. 4, 2019

(65) Prior Publication Data

US 2020/0217808 A1 Jul. 9, 2020

(51) Int. Cl.
*G01N 23/20008* (2018.01)
*G01N 23/203* (2006.01)

(52) U.S. Cl.
CPC ..... *G01N 23/20008* (2013.01); *G01N 23/203* (2013.01); *G01N 2223/053* (2013.01); *G01N 2223/32* (2013.01); *G01N 2223/505* (2013.01)

(58) Field of Classification Search
CPC ........... G01N 23/20008; G01N 23/203; G01N 2223/32; G01N 2223/505; G01N 2223/053
See application file for complete search history.

(56) References Cited

U.S. PATENT DOCUMENTS

| | | | | |
|---|---|---|---|---|
| 5,103,099 A | * | 4/1992 | Bourdinaud | G01T 1/20 250/368 |
| 5,793,046 A | * | 8/1998 | Jeffers | G01T 1/20 250/364 |
| RE36,201 E | * | 4/1999 | Miller | G01T 3/06 250/390.04 |
| 7,567,649 B1 | * | 7/2009 | Safai | G01T 1/24 250/370.09 |
| 8,879,688 B2 | | 11/2014 | Safai | |
| 10,365,381 B1 | * | 7/2019 | Cahill | G01T 1/201 |
| 10,483,316 B2 | * | 11/2019 | Okandan | G01T 1/24 |
| 2004/0238751 A1 | * | 12/2004 | Penn | G01T 3/00 250/390.01 |
| 2006/0060823 A1 | * | 3/2006 | Cooke | C09K 11/7774 252/301.36 |
| 2006/0153341 A1 | * | 7/2006 | Guyonnet | G01T 1/201 378/207 |

(Continued)

FOREIGN PATENT DOCUMENTS

WO  WO-2017095430 A1 *  6/2017  ........... G01T 1/2018

*Primary Examiner* — Christine S. Kim
(74) *Attorney, Agent, or Firm* — Kwan & Olynick LLP

(57) ABSTRACT

Provided are backscatter detection systems and methods implementing sensor arrays comprising flexible scintillators, and associated methods of operations. Specifically, an apparatus for detecting backscatter of a radiation beam formed in response to the radiation beam encountering an object comprises a structure configured to change from a first shape to a second shape. The apparatus further comprises a sensor array which comprises a flexible scintillating panel covering an area of the structure, and configured to conform to the shape of the structure form the first shape to the second shape. The flexible scintillating panel may comprise a plurality of optical fibers enclosed in a semi-rigid casing and coupled to a light detector. The plurality of optical fibers may be arranged in one or more layers. A layer of optical fibers may be arranged in a plurality of clusters or in an interwoven configuration.

20 Claims, 9 Drawing Sheets

(56) References Cited

U.S. PATENT DOCUMENTS

| | | | |
|---|---|---|---|
| 2009/0050812 A1* | 2/2009 | Dunleavy | G01T 1/201 |
| | | | 250/368 |
| 2012/0208857 A1* | 8/2012 | Burak | A61K 47/12 |
| | | | 514/376 |
| 2013/0315376 A1* | 11/2013 | Safai | G01N 23/20008 |
| | | | 378/87 |
| 2017/0313938 A1* | 11/2017 | Bilgin | D01F 9/08 |
| 2019/0010076 A1* | 1/2019 | Morse | G02B 6/00 |
| 2019/0293810 A1* | 9/2019 | Couture | H01L 27/14601 |
| 2020/0064501 A1* | 2/2020 | Jadrich | G01N 23/083 |

* cited by examiner

RECONFIGURABLE BACKSCATTER DETECTOR

TECHNICAL FIELD

The present disclosure relates generally to inspection systems, and in particular, to backscatter inspection systems. Still more particularly, the present disclosure relates to a method and apparatus for detecting backscatter off of an object using a detector having a shape capable of substantially conforming to a shape of the object.

BACKGROUND

In aircraft and launch vehicle construction, various surfaces, such as the skin of an aircraft, may be attached to structural support members known as stringers or stiffeners. In aircraft fuselage, stringers are attached to the fuselage skin run in the longitudinal direction of the aircraft. They are primarily responsible for transferring the aerodynamic loads acting on the skin onto internal structures including frames. In the wings or horizontal stabilizer of an aircraft, stringers attach to the wing skin and their primary function here also is to transfer the bending loads acting on the wings onto internal structures such as ribs and spars.

A backscatter x-ray system is an example of a nondestructive inspection system (NDI) that uses x-rays to inspect an object. Some currently available backscatter x-ray systems include an x-ray tube, a collimator, and a detector. The x-ray tube generates and emits x-rays. The collimator filters these x-rays to form an x-ray beam using a portion of the x-rays that travel substantially parallel to a specified direction.

When the x-ray beam encounters the object, some or all of the x-rays in the x-ray beam are scattered by the object. In particular, the x-rays may be scattered off of the surface of the object and/or the subsurface of the object. The scattered x-rays are referred to as backscatter. The detector detects some or all of this backscatter. The detected backscatter may be used to generate image data for the object that can be used to form one or more images of the object. For example, the backscatter detected when the x-ray beam is directed at a particular location on the object may be used to generate an intensity value for a pixel in an image that corresponds to that particular location on the object.

The x-ray beam may be moved along the object in a selected pattern such as, for example, a raster pattern, such that image data may be generated for different locations on the object. In one illustrative example, the direction in which the x-ray beam is pointed may be changed such that the angle of incidence of the x-ray beam, with respect to the object, changes. This image data is used to form one or more images of the object that may be used to determine whether any inconsistencies are present in the object.

The detectors used in some currently available backscatter x-ray systems have a substantially planar shape. In other words, these detectors have a flat shape. The number of locations in which a backscatter x-ray system can be used may be limited when the detector in the backscatter x-ray system has a flat shape. For example, positioning a backscatter x-ray system with a detector having a flat shape relative to an object having a curved shape may be more difficult than desired.

Further, with a detector having a flat shape, the amount of backscatter detected by the detector may be less than desired for different angles of incidence of the x-ray beam with respect to the object when the object has a curved shape. In other words, the amount of backscatter detected by the detector may be less than desired for different angles of incidence of the x-ray beam when the object has a curved shape.

Consequently, images formed using the image data generated by a detector having a flat shape may not have a desired level of quality when used to detect backscatter off of a curved object. Therefore, it would be desirable to have a method and apparatus that takes into account at least some of the issues discussed above, as well as other possible issues.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are backscatter detection systems implementing sensor arrays comprising flexible scintillators, and associated methods of operations. Specifically, an apparatus for detecting backscatter comprises a structure including a shape. The shape is configured to change from a first shape to a second shape. The apparatus further comprises a sensor array which comprises a flexible scintillating panel covering an area of the structure. The flexible scintillating panel is configured to conform to the shape of the structure form the first shape to the second shape. The apparatus is configured to detect backscatter of a radiation beam formed in response to the radiation beam encountering an object.

The flexible scintillating panel may comprise a plurality of optical fibers. The sensor array may further comprise a light detector coupled to the plurality of optical fibers. The plurality of optical fibers may comprise organic fibers. The plurality of optical fibers may be enclosed in a semi-rigid casing.

The plurality of optical fibers may be arranged in one or more layers within the semi-rigid casing. Each optical fiber within a first layer of the one or more layers may be coupled to one or more adjacent optical fibers in the first layer. At least one optical fiber in a first layer of the one or more layers may be coupled to at least one optical fiber in a second layer of the one or more layers, wherein the second layer is adjacent to the first layer. The optical fibers within a first layer of the one or more layers may be arranged in a plurality of clusters of optical fibers.

The plurality of optical fibers may be arranged in one or more layers, with optical fibers within a first layer of the one or more layers arranged in an interwoven configuration. The interwoven configuration may be a plain weave arrangement.

The sensor array may further comprise a light detector. The plurality of optical fibers may be grouped into one or more bundles, wherein each of the one or more bundles is coupled to the light detector. Light produced by scintillation of the optical fibers may be transmitted through the optical fibers to the light detector.

The structure may comprise a plurality of segments connected to each other by a number of flexible joints. Movement of at least one segment in the plurality of segments relative to another segment in the plurality of segments about a flexible joint of the number of flexible joints changes the shape of the structure. The shape of the structure may be configured to change in three dimensions. Each segment of the structure may comprise a rectangular surface. In some embodiments, the structure may comprise a deformable material, wherein deformation of the deformable material changes the shape of the structure. The structure may comprise a flexible circuit, wherein changing a configuration of the flexible circuit changes the shape of the structure.

The second shape of the apparatus may substantially conform to a substantially non-planar shape of a surface of the object, the first shape of the apparatus and the second shape of the apparatus are different, and the second shape of the apparatus may be a selected shape of the apparatus. The selected shape may substantially conform to the substantially non-planar shape of the surface of the object, and the substantially non-planar shape of the surface of the object and the selected shape may comprise at least one of a wavy shape, a curved shape, and a toroidal shape.

The apparatus may further comprise an electromechanical system configured to repeatedly reconfigure the structure as a moveable platform moves the apparatus relative to the object. The moveable platform may be associated with the apparatus, the electromechanical system may repeatedly reconfigure the structure using data from the sensor array, and the electromechanical system may repeatedly reconfigure the structure such that the shape of the apparatus changes to substantially conform to the substantially non-planar shape of the surface of the object. The data from the sensor array may comprise at least one of: images of the object and video of the object.

The apparatus may further comprise a radiation source configured to emit radiation, wherein the radiation comprises x-rays configured to at least partially penetrate the object. The apparatus may further comprise a collimator configured to form the radiation beam using a portion of the radiation emitted by the radiation source, wherein the radiation beam is directed towards a surface of the object.

The radiation source and the collimator may form a radiation generation system. The radiation generation system may be associated with the moveable platform. The apparatus may further comprise a housing connected to the moveable platform, wherein the radiation source is located inside the housing.

The radiation source may be an x-ray tube, and the radiation beam beam may be an x-ray beam. Each of a number of portions of the flexible scintillating panel may be substantially equidistant from the substantially non-planar shape of the surface of the object relative to all other portions in the number of portions in the number of portions of the flexible scintillating panel.

The collimator may comprise a rotatable wheel having a number of apertures. The rotatable wheel may be configured to rotate while the radiation source emits the radiation in which the portion of the radiation emitted by the radiation source passes through an aperture in the number of apertures to form the radiation beam.

Other implementations of this disclosure include systems and methods corresponding to the described apparatus. For instance, in another aspect, which may include at least a portion of the subject matter of any of the preceding and/or following examples and aspects, a backscatter x-ray system is provided which comprises an x-ray tube configured to emit x-rays, and a collimator configured to form an x-ray beam using a portion of the x-rays emitted by the x-ray tube.

The x-ray beam is directed towards a surface of an object. The system further comprises a detector system as described above.

Also provided is a method of inspecting an object. The method comprises identifying a selected shape for a detector system in a backscatter inspection system. The selected shape comprises a substantially non-planar shape of a surface of the object. The method further comprises changing a shape of the detector system from a first shape of the detector system to a second shape of the detector system using a structure in the detector system. The second shape of the detector system substantially conforms to the substantially non-planar shape of the surface of the object.

The detector system may comprise a flexible scintillating panel covering an area of the structure. The flexible scintillating panel is configured to conform to the shape of the detector system from the first shape to the second shape.

The method further comprises emitting a radiation beam towards the surface of the object. The radiation beam may be formed using a portion of radiation emitted from a radiation source, wherein the radiation comprises x-rays configured to at least partially penetrate the object. The method further comprises detecting backscatter formed in response to the radiation beam encountering the object using the detector system having the selected shape.

The method may further comprise repeatedly reconfiguring the structure as a moveable platform moves relative to the object using an electromechanical system. The moveable platform may be associated with the detector system, the step of repeatedly reconfiguring the structure may use data from the sensor array, and the step of repeatedly reconfiguring the structure changes the shape of the detector system to substantially conform to the substantially non-planar shape of the surface of the object.

Emitting the radiation beam towards the surface of the object may include forming the radiation beam with a collimator configured to form the radiation beam using a portion of the radiation emitted by the radiation source. The radiation source and the collimator form a radiation generation system, and at least one of the radiation generation system and the detector system are associated with the moveable platform. The backscatter inspection system may further comprises a housing connected to the moveable platform, wherein the radiation source is located inside the housing.

These and other embodiments are described further below with reference to the figures.

DETAILED DESCRIPTION OF PARTICULAR EMBODIMENTS

Figure 1:
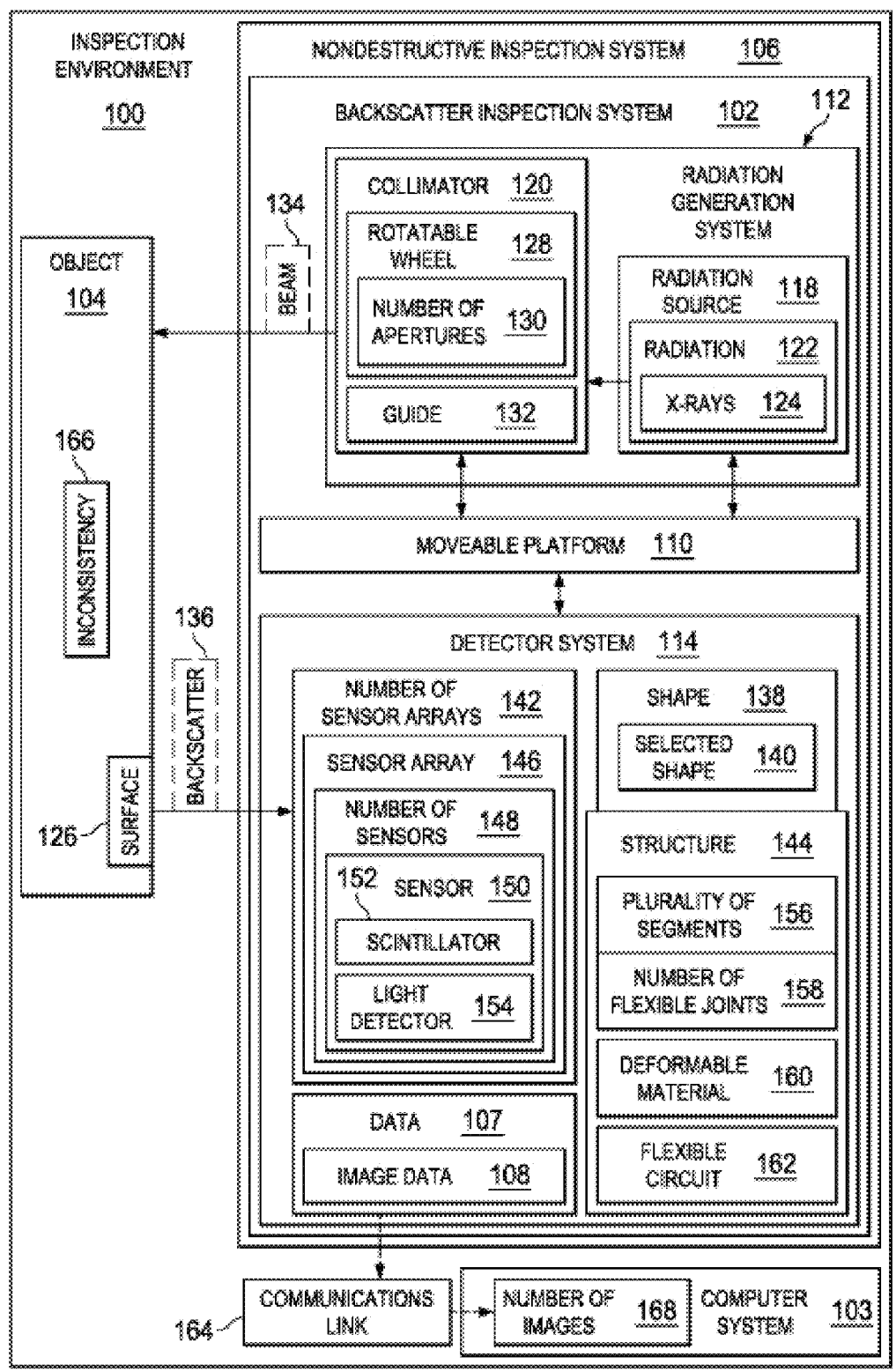
FIG. 1 is an illustration of an inspection environment in the form of a block diagram in accordance with an illustrative embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aircraft structures, such as skin panels. However, it should be noted that the techniques and mechanisms of the present disclosure may apply to various other panel assemblies of various other vehicles or building structures. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some embodiments include multiple iterations of a technique or multiple instantiations of a mechanism unless noted otherwise.

Overview

The different illustrative embodiments recognize and take into account that images formed using the image data generated by some currently available backscatter x-ray systems may not have the desired amount of contrast. Without this desired amount of contrast, identifying inconsistencies in an object inspected using these backscatter x-ray systems may be more difficult than desired. In particular, the different illustrative embodiments recognize and take into account that a detector having a substantially planar shape may be unable to detect a desired amount of the backscatter formed when an x-ray beam encounters an object having a substantially non-planar shape.

For example, the angle of incidence of an x-ray beam with respect to an object that has a curved shape may change when the x-ray beam is moved along the object. A detector having a flat shape may be unable to detect a desired amount of backscatter for these different angles of incidence of the x-ray beam with respect to the object. In other words, the detector may miss a portion of the backscatter when the object has a curved shape and the detector has a flat shape.

The different illustrative embodiments also recognize and take into account that the amount of backscatter detected by a detector determines the intensity value for a pixel in an image corresponding to the location at which the x-ray beam encounters the object. The intensity values for the pixels in an image may determine the level of contrast in the image and the level of detail in the image.

The image data generated by a detector having a flat shape may have a lower level of contrast and/or a lower level of detail than desired when the detector misses a portion of the backscatter formed as an x-ray beam moves along an object having a curved shape. Consequently, the different illustrative embodiments recognize and take into account that it may be desirable to have a detector configured to capture a greater portion of the backscatter formed as compared to currently available detectors.

Thus, the different illustrative embodiments provide a method and apparatus for inspecting an object using a backscatter x-ray system. In particular, the different illustrative embodiments provide a backscatter x-ray system with a detector having a shape that may be changed to substantially conform to a shape of a surface of the object being inspected.

EXAMPLE EMBODIMENTS

With reference now to the figures and, in particular, with reference to FIG. 1, an illustration of an inspection environment in the form of a block diagram is depicted in accordance with an illustrative embodiment. In these illustrative examples, inspection environment 100 includes backscatter inspection system 102, computer system 103, and object 104.

Backscatter inspection system 102 is one example of nondestructive inspection (NDI) system 106. As used herein, a "nondestructive inspection system", such as nondestructive inspection system 106, is a system configured to inspect an object, such as object 104, without causing any undesired effects to the object. In particular, a nondestructive inspection system is configured to inspect an object without causing any physical alterations to the object.

In these illustrative examples, backscatter inspection system 102 may be used to inspect object 104. Object 104 may be selected from any number of different types of objects. For example, without limitation, object 104 may take the form of a mobile platform, a stationary platform, an air-based structure, a land-based structure, an aquatic-based structure, a space-based structure, or some other suitable type of structure. More specifically, object 104 may be a an aircraft, a ship, a tank, a personnel carrier, a spacecraft, a space station, a satellite, a submarine, a vehicle, a manmade structure, a building, or some other suitable type of object.

In some cases, object 104 may be a part in another object. For example, in some cases, object 104 may be a section of a fuselage for an aircraft, a wing, a fuel tank, a structural support on a bridge, a section of a space station, the hull of a ship, a skin panel, a wall, a door, or some other suitable type of part.

Backscatter inspection system 102 generates data 107 for object 104 during inspection of object 104. Data 107 may include, for example, without limitation, image data 108 for object 104. Backscatter inspection system 102 sends data 107 to computer system 103. Computer system 103 is configured to receive and process data 107 generated by backscatter inspection system 102.

In this illustrative example, backscatter inspection system 102 includes moveable platform 110, radiation generation system 112, and detector system 114. Radiation generation system 112 and/or detector system 114 may be associated with moveable platform 110.

When one component is "associated" with another component, the association is a physical association in these depicted examples. For example, a first component, such as detector system 114, may be considered to be associated with a second component, such as moveable platform 110, by being secured to the second component, bonded to the second component, mounted to the second component, welded to the second component, fastened to the second component, and/or connected to the second component in some other suitable manner.

The first component also may be connected to the second component using a third component. Additionally, the first component may be considered to be associated with the second component by being formed as part of and/or an extension of the second component Moveable platform 110 may be any platform configured to move over a surface. This movement may include translation and/or rotation. Moveable platform 110 may take various forms depending on the particular implementation. In one illustrative example, moveable platform 110 may be a cart.

Moveable platform 110 may include movement devices such as, for example, without limitation, wheels, rollers, sliders, a track system, and other types of movement devices. These movement devices may allow moveable platform 110 to move or be moved on a surface, such as, for example, without limitation, a floor, a rail system, or some other suitable type of surface.

In one illustrative example, moveable platform 110 may be moved by a human operator pushing moveable platform 110. In another illustrative example, moveable platform 110 may be moved using a propulsion system in moveable platform 110.

In these illustrative examples, radiation generation system 112 comprises radiation source 118 and collimator 120. Radiation source 118 is configured to generate radiation 122. Radiation 122 comprises a plurality of rays. Radiation 122 may take a number of different forms. In these illustrative examples, radiation 122 may take the form of x-rays, gamma rays, or some other suitable type of radiation configured to at least partially penetrate object 104.

As one illustrative example, radiation source 118 may take the form of an x-ray tube configured to generate and emit x-rays 124. X-rays 124 may be directed towards surface 126 of object 104.

In these illustrative examples, collimator 120 may be associated with at least one of moveable platform 110 and radiation source 118. Collimator 120 is a device configured to filter the plurality of rays in radiation 122 such that only the portion of rays traveling parallel to a specified direction are allowed to pass through collimator 120.

In particular, collimator 120 uses a portion of radiation 122 to form radiation beam 134. Beam 134 may be directed towards surface 126 of object 104. When radiation 122 takes the form of x-rays 124, beam 134 is referred to as an x-ray beam.

In one illustrative example, collimator 120 takes the form of rotatable wheel 128. Rotatable wheel 128 has number of apertures 130. As used herein, a "number of" items means one or more items. For example, number of apertures means one or more apertures. In this manner, number of apertures 130 may be one aperture in some cases and may be two, three, five, or some other suitable number of apertures in other cases.

Rotatable wheel 128 is configured to rotate around radiation source 118 while radiation source 118 emits radiation 122. As rotatable wheel 128 rotates, a portion of radiation 122 passes through an aperture in number of apertures 130 to form beam 134.

Of course, in other illustrative examples, collimator 120 may have guide 132. Guide 132 is a channel within collimator 120 through which rays may pass. In particular, collimator 120 may absorb a portion of the rays in radiation 122, scatter a portion of the rays in radiation 122, or perform a combination of the two such that only rays that travel in the direction of a center axis through guide 132 may pass through collimator 120.

Detector system 114 is configured to detect backscatter 136 formed in response to beam 134 encountering object 104. Backscatter 136 may be formed in response to at least a portion of beam 134 being scattered when beam 134 encounters surface 126 of object 104 and/or the subsurface of object 104. In these illustrative examples, detector system 114 has shape 138. Shape 138 of detector system 114 is configured to be changed into selected shape 140.

For example, selected shape 140 may be a surface shape for surface 126 of object 104 being inspected. The surface shape of surface 126 of object 104 may comprise, for example, without limitation, at least one of a convex shape, a concave shape, a wavy shape, a curved shape, an L-shape, a U-shape, a toroidal shape, or some other suitable type of substantially non-planar shape.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; or some other suitable combination.

In these illustrative examples, selected shape 140 for detector system 114 may be identified in a number of different ways. As one illustrative example, selected shape 140 may be identified from a database of known geometries for different types of objects to be inspected. For example, selected shape 140 may be identified using a digital computer aided design (CAD) model of the object 104 stored in a database.

In some illustrative examples, selected shape 140 may be identified using images of object 104 to be inspected. Selected shape 140 may also be identified using sensor data generated while detector system 114 is positioned relative to object 104 being inspected. For example, a number of sensor systems may be used to generate images, ultrasound images, acoustic data, radar images, infrared images, and/or other suitable types of sensor data that can be used to identify selected shape 140. Of course, selected shape 140 may be identified in other ways not described above.

In one illustrative example, detector system 114 comprises number of sensor arrays 142 and structure 144. Number of sensor arrays 142 is associated with structure 144 in this illustrative example. Sensor array 146 is an example of one of number of sensor arrays 142. Sensor array 146 comprises number of sensors 148 arranged in a number of rows and in a number of columns. Sensor 150 is an example of one of number of sensors 148. In some embodiments detector system comprises a single sensor array, such as sensor array 146. In some embodiments, example sensor array 146 comprises a single sensor, such as sensor 150. In some embodiments, scintillator 152 of sensor 150 is a flexible scintillator panel comprising a plurality of optical fibers coupled to light detector 154.

In some illustrative examples, sensor 150 may also be referred to as a detector. In this manner, number of sensors 148 may be a number of detectors, sensor array 146 may be a detector array, and number of sensor arrays 142 may be a number of detector arrays.

In this illustrative example, sensor 150 may comprise scintillator 152 and light detector 154. Scintillator 152 may comprise a material configured to luminesce when hit by ionizing radiation, such as, for example, the particles of backscatter 136. This material is referred to as a scintillating material. When scintillator 152 luminesces, photons are emitted from the scintillator 152.

Light detector 154 is configured to measure the number of photons emitted from scintillator 152. The number of photons detected by all of the light detectors in number of sensor arrays 142 may determine the value generated by detector system 114 for the particular location on object 104 at which beam 134 was pointed. This value may be an intensity value for a pixel in an image of object 104 corresponding to the location at which beam 134 was pointed. Shape 138 of detector system 114 may be changed such that the number of photons detected by the different light detectors in number of sensor arrays 142 as beam 134 moves along surface 126 of object 104 allows image data having a desired level of detail and a desired level of contrast to be generated.

In this illustrative example, light detector 154 may have a configuration based on micro-electromechanical systems (MEMS) technology. For example, light detector 154 may be selected from one of a photomultiplier tube (PMT), a photoelectric sensor, a photodiode, or some other type of light detector implemented using micro-electromechanical systems technology. In one illustrative example, light detector 154 takes the form of a micro-photomultiplier tube (micro-PMT o μ-PMT).

When sensor 150 includes scintillator 152 and light detector 154, sensor 150 may take the form of a scintillation detector or a scintillation counter. Of course, in other illustrative examples, sensor 150 may take the form of a solid-state detector, a semiconductor radiation detector, or some other suitable type of detector.

In this illustrative example, shape 138 of detector system 114 may be changed using structure 144. For example, structure 144 may comprise plurality of segments 156 connected to each other through number of flexible joints 158. Movement of at least one segment in plurality of segments 156 relative to another segment in plurality of segments 156 about a flexible joint in number of flexible joints 158 changes shape 138 of detector system 114. When structure 144 has this type of configuration, structure 144 may be referred to as an "articulated structure."

A segment in plurality of segments 156 may be moved relative to another segment in plurality of segments 156 in a number of different ways. For example, these segments may be moved manually. A human operator may use his hands to move one or more of plurality of segments 156 about one or more of number of flexible joints 158. In some cases, plurality of segments 156 may be moved by an electromechanical system configured to receive commands from a control system.

In another example, structure 144 may take the form of deformable material 160. Deformation of deformable material 160 changes shape 138 of detector system 114. Deformable material 160 may comprise, for example, without limitation, an organic material, a silicon-based material, or some other suitable type of material capable of being deformed. Deformable material 160 may be deformed manually in these illustrative examples.

In some illustrative examples, structure 144 may take the form of flexible circuit 162. Flexible circuit 162 may comprise any number of lines and controls having a configuration that may be changed when power is supplied to these lines and controls. Changing a configuration of flexible circuit 162 changes shape 138 of detector system 114.

In this manner, shape 138 of detector system 114 may be changed in a number of different ways. Shape 138 of detector system 114 may be reconfigurable using structure 144. In particular, shape 138 may be changed into selected shape 140 such that shape 138 of detector system 114 substantially conforms to a surface shape for surface 126 of object 104.

In some illustrative examples, an electromechanical system may be used to reconfigure structure 144 based on input received from a digital model of object 104. In other illustrative examples, structure 144 may be reconfigured manually to substantially match selected shape 140. Further, depending on the implementation, structure 144 may be repeatedly reconfigured as moveable platform 110 moves relative to object 104. Sensor data, such as images or video of object 104, may be used to change shape 138 of detector system 114 such that shape 138 substantially conforms to a surface shape for surface 126 of object 104 as moveable platform 110 with detector system 114 moves relative to object 104.

Detector system 114 generates data 107 in response to detecting backscatter 136. Image data 108 in data 107 may include, for example, an intensity value for a pixel corresponding to each of a plurality of locations on object 104 at which beam 134 was directed.

Detector system 114 sends data 107 to computer system 103 for processing using communications link 164. Communications link 164 may be a wireless communications link, a wired communications link, an optical communications link, or some other suitable type of communications link.

Computer system 103 may include one or more computers, depending on the implementation. When more than one computer is present in computer system 103, these computers may be in communication with each other using a medium such as a network. The network may employ wired communications links, wireless communications links, and other suitable types of links for exchanging information.

Data 107 may be used to determine whether inconsistency 166 is present in object 104. Inconsistency 166 may be present at surface 126 of object 104 or within an interior of object 104. In one illustrative example, computer system 103 uses data 107 to form number of images 168 of object 104. Number of images 168 may be analyzed by computer system 103 and/or a human operator to detect the presence of, and identify the location of, inconsistency 166 in object 104. Of course, in other illustrative examples, image data 108 in data 107 generated by detector system 114 may take the form of number of images 168.

Depending on the implementation, computer system 103 may be configured to control at least one of radiation generation system 112, moveable platform 110, and detector system 114. For example, computer system 103 may send commands to moveable platform 110 and/or collimator 120 to control the steering of beam 134. In some cases, computer system 103 may send commands to detector system 114 to control shape 138 of detector system 114. For example, computer system 103 may send commands to flexible circuit 162 to change shape 138 of detector system 114.

With the different configurations for detector system 114 described in FIG. 1, less radiation 122 may need to be emitted from radiation source 118. Further, the size of radiation source 118 as well as the overall size of backscatter inspection system 102 may be reduced with detector system 114 having shape 138 that is reconfigurable. Additionally, using micro-electromechanical systems technology may allow number of sensor arrays 142 to be manufactured in a cost-effective and efficient manner.

The illustration of inspection environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, the different sensors in number of sensor arrays 142 may not include scintillators. Instead, a single piece of scintillating material may be placed over each sensor array in number of sensor arrays 142. In some cases, a single piece of scintillating material may be placed over all of the sensor arrays in number of sensor arrays 142.

Figure 2:
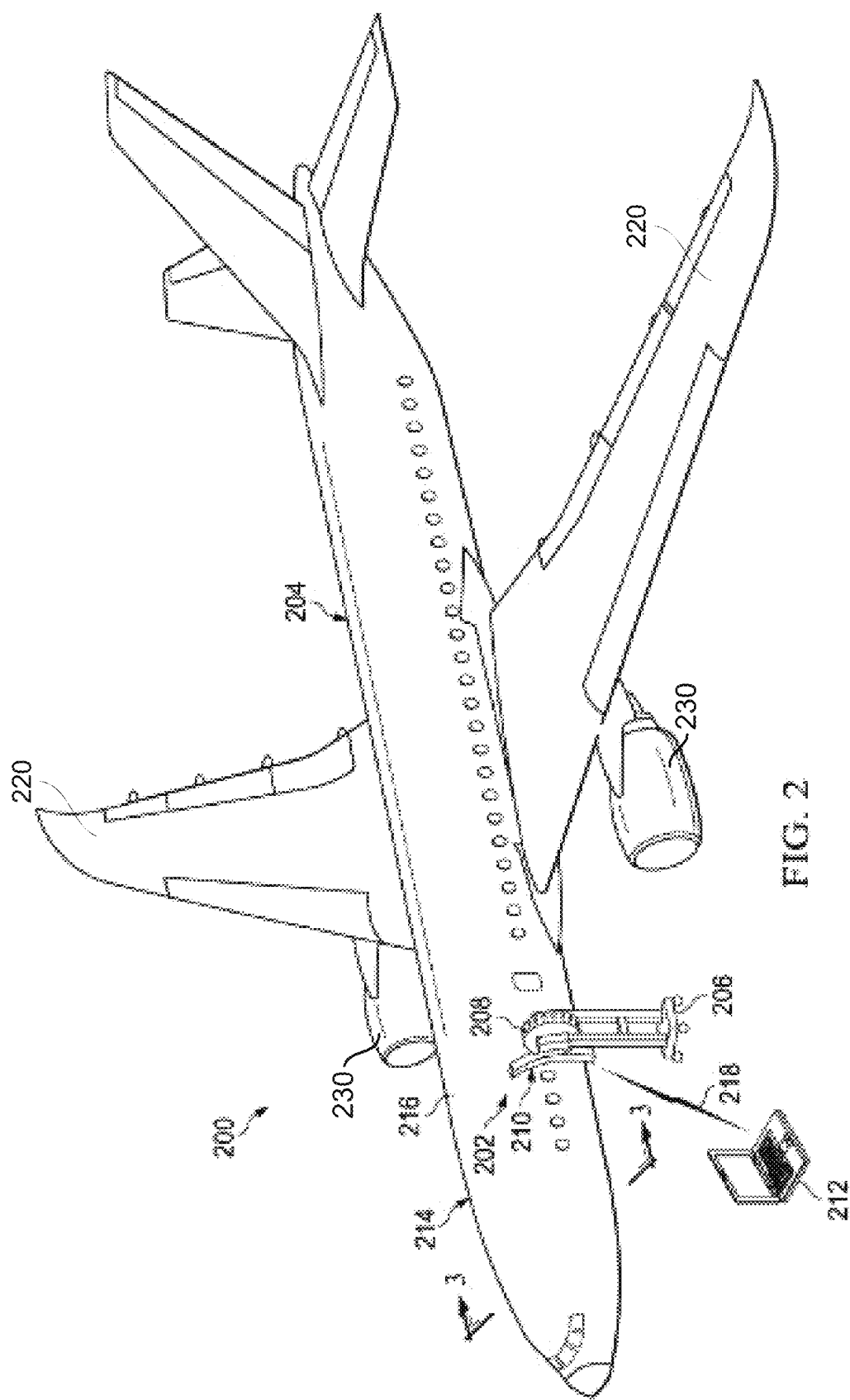
FIG. 2 is an illustration of an inspection environment in accordance with an illustrative embodiment.

With reference now to FIG. 2, an illustration of an inspection environment is depicted in accordance with an illustrative embodiment. In FIG. 2, inspection environment 200 is an example of one implementation for inspection environment 100 in FIG. 1. Backscatter inspection system 202 is configured to perform an inspection of aircraft 204 in inspection environment 200.

Backscatter inspection system 202 is an example of one implementation for backscatter inspection system 102 in FIG. 1. In this illustrative example, backscatter inspection system 202 is a backscatter x-ray system. Further, aircraft 204 is an example of one implementation for object 104 in FIG. 1.

As depicted, backscatter inspection system 202 includes moveable platform 206, radiation generation system 208, detector system 210, and computer system 212. Moveable platform 206, radiation generation system 208, detector system 210, and computer system 212 are examples of implementations for moveable platform 110, radiation generation system 112, detector system 114, and computer system 103, respectively, in FIG. 1.

In this illustrative example, radiation generation system 208 and detector system 210 are connected to moveable platform 206. Computer system 212 is located away from moveable platform 206.

Radiation generation system 208 is configured to generate x-rays and direct a portion of these x-rays towards fuselage 214 of aircraft 204 in the form of an x-ray beam. In particular, radiation generation system 208 directs the x-ray beam towards surface 216 of fuselage 214 of aircraft 204. Surface 216 is an exterior surface of fuselage 214. Additionally, radiation generation system 208 may move the x-ray beam along surface 216 of fuselage 214 such that the angle of incidence of the x-ray beam with respect to surface 216 of fuselage 214 changes.

The x-ray beam may at least partially penetrate surface 216 of fuselage 214 of aircraft 204. Detector system 210 is configured to detect backscatter formed in response to the x-ray beam encountering fuselage 214. Detector system 210 may generate image data that is sent to computer system 212 over wireless communications link 218. Detector system 210 is described in greater detail in FIGS. 3-4.

Figure 3:
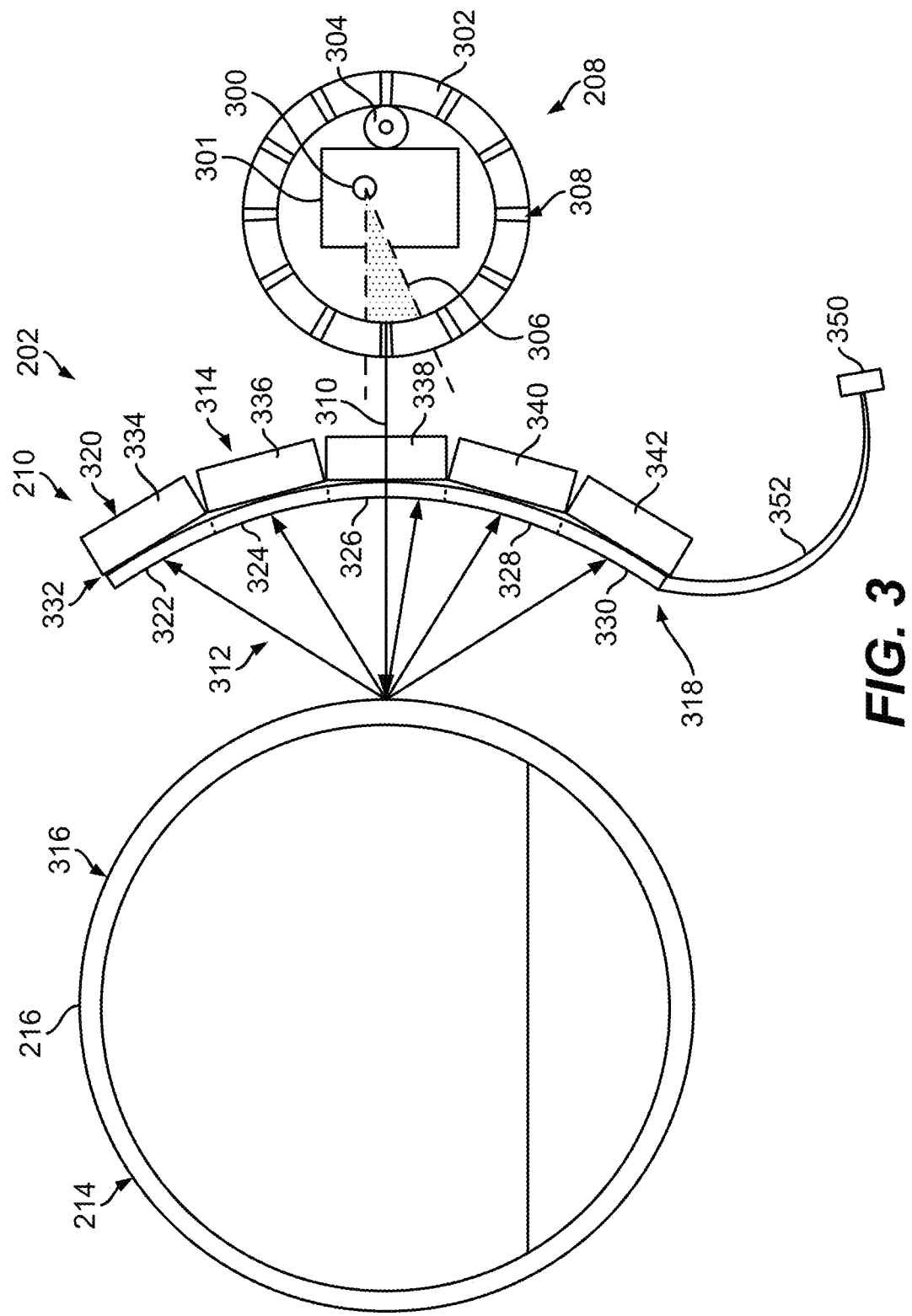
FIG. 3 is an illustration of a cross-sectional view of an aircraft being inspected by a backscatter inspection system in accordance with an illustrative embodiment.

Turning now to FIG. 3, an illustration of a cross-sectional view of an aircraft being inspected by a backscatter inspection system is depicted in accordance with an illustrative embodiment. In this illustrative example, a cross-sectional view of aircraft 204 from FIG. 2, taken along lines 3-3, is depicted along with backscatter inspection system 202. Moveable platform 206 of backscatter inspection system 202 is not shown in this view such that radiation generation system 208 may be more clearly seen.

In this illustrative example, radiation generation system 208 includes radiation source 300, housing 301, rotatable wheel 302, and motor 304. Radiation source 300 is an example of one implementation for radiation source 118 in FIG. 1. As depicted, radiation source 300 is located within housing 301. Housing 301 may be connected to moveable platform 206 in FIG. 2. Radiation source 300 is configured to generate and emit x-rays 306.

Rotatable wheel 302 is associated with radiation source 300. Rotatable wheel 302 is an example of one implementation for rotatable wheel 128 in FIG. 1. Rotatable wheel 302 has number of apertures 308. Operation of motor 304 is configured to rotate rotatable wheel 302 such that number of apertures 308 rotate around radiation source 300.

As rotatable wheel 302 rotates, a portion of x-rays 306 is configured to pass through an aperture in number of apertures 308 to form x-ray beam 310. X-ray beam 310 is directed towards surface 216 of fuselage 214. The x-rays in x-ray beam 310 scatter in response to encountering fuselage 214. These scattered x-rays form backscatter 312.

Detector system 210 detects backscatter 312. As depicted, detector system 210 has shape 314. Shape 314 is reconfigurable. In other words, shape 314 of detector system 210 may be changed.

In this illustrative example, shape 314 is configured to substantially conform to surface shape 316 of surface 216 of fuselage 214. In particular, shape 314 is a convex shape with respect to radiation generation system 208 that is similar to surface shape 316 of surface 216 of fuselage 214, which is also a convex shape with respect to radiation generation system 208.

In this illustrative example, detector system 210 includes sensor array 318 and structure 320. The shape of structure 320 is shape 314 of detector system 210. In this manner, both detector system 210 and structure 320 have shape 314. Sensor array 318 includes flexible scintillator 321 and light detector 350. As described herein, a flexible scintillator may be referred to herein as a "flexible scintillating panel" or "flexible scintillating sheet." Although flexible scintillator 321 may comprise a single structure of multiple optical fibers, different portions of scintillator 321 are shown separated by dashed lines, including portions 322, 324, 326, 328, and 330.

Structure 320 comprises plurality of segments 332. Plurality of segments 332 includes segments 334, 336, 338, 340, and 342. Each segment 334, 336, 338, 340, and 342 is associated with corresponding portions 322, 324, 326, 328, and 330 of scintillator 321, respectively. Segments 334, 336, 338, 340, and 342 may be connected to each other by flexible joints. For example, segment 334 may be configured to move relative to segment 336 about a flexible joint connecting segment 334 and segment 336. Each portion of scintillator 321 moves along with its corresponding segment of structure 320. Thus, when segment 334 moves relative to segment 336, the corresponding portion 322 of scintillator 321 also moves relative to portion 324. As such, the shape of scintillator 321 at least substantially conforms to the shape 314 of structure 320 as the segments of structure 320 are moved.

One or more segments in plurality of segments 332 may be moved relative to each other such that structure 320 may have shape 314 that substantially conforms to surface shape 316 of surface 216 of fuselage 214. For example, structure 320 may be bent at one or more of the flexible joints connecting plurality of segments 332 such that shape 314 of structure 320 changes to substantially conform to surface shape 316 of surface 216 of fuselage 214. As such, the shape of scintillator 321 can at least substantially conform to the surface shape 316 such that each portion of scintillator 321 is substantially equidistant from the substantially shape 316 of the surface of fuselage 214 relative to all other portions of scintillator 321.

As described herein, flexible scintillator 321 may comprise a plurality of optical fibers. Such optical fibers may be stacked, woven, or otherwise arranged together to form a flexible panel. In some embodiments, the optical fibers may be collected into one or more bundles. In some embodiments, the one or more bundles of optic fibers may be fed into a light detector. In some embodiments, each bundle may be fed into a different light detector. Additional details of the configuration of a flexible scintillator are further described with regards to FIGS. 6A-6E. As shown, in FIG. 3, the optical fibers of scintillator 321 are collected into bundle 352 and fed into light detector 350. In various embodiments, the optical fibers may absorb energy from backscatter 312 and scintillate. The optical fibers may then transmit the produced light to light detector 350, such as a MEMS PMT configured to measure the total amount of scintillation produced by scintillator 321.

Figure 4:
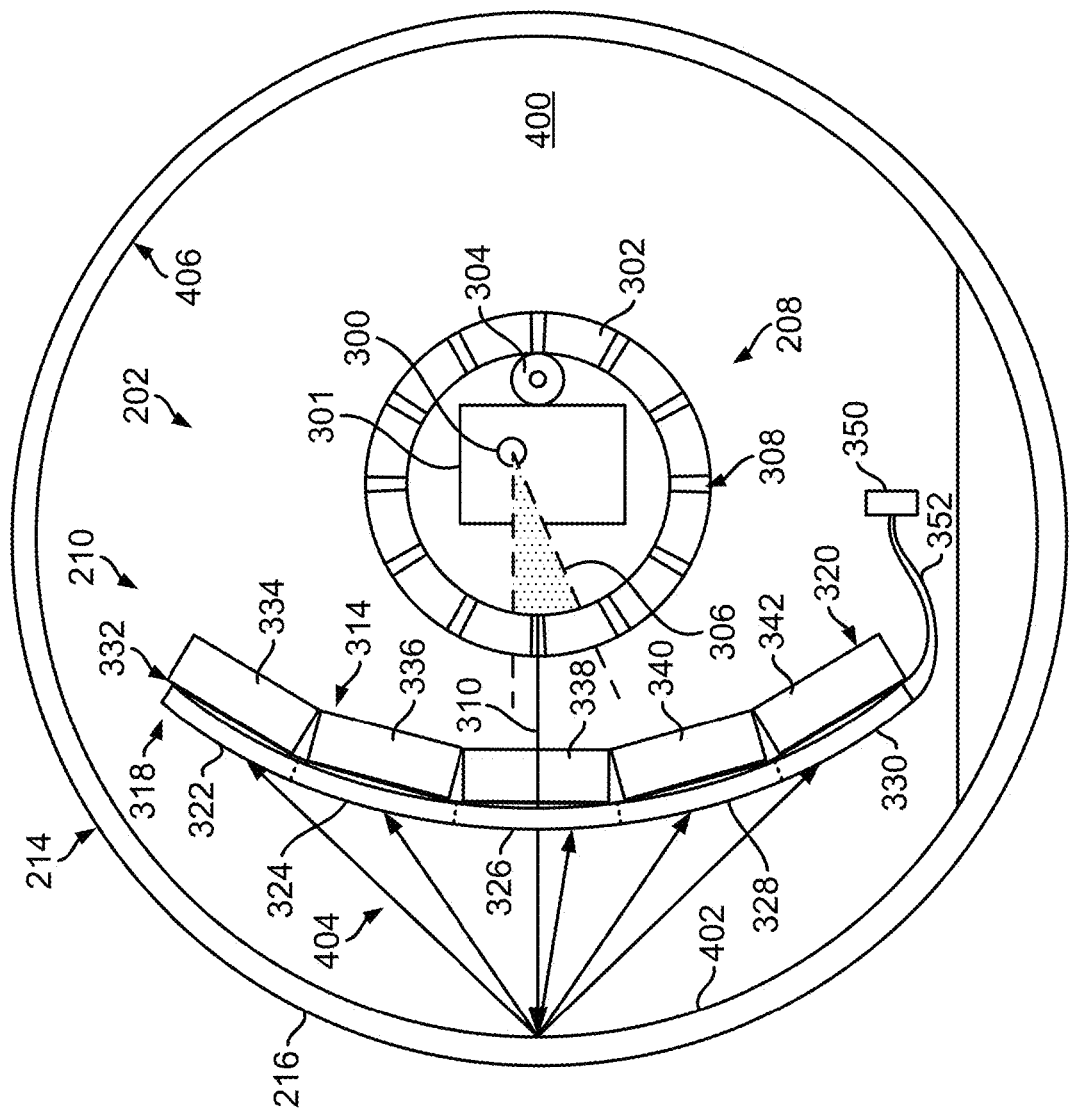
FIG. 4 is an illustration of a cross-sectional view of an aircraft being inspected by a backscatter inspection system in accordance with an illustrative embodiment.

Turning now to FIG. 4, an illustration of a cross-sectional view of an aircraft being inspected by a backscatter inspection system is depicted in accordance with an illustrative embodiment. In this illustrative example, the cross-sectional view of aircraft 204 from FIG. 3 is depicted with backscatter inspection system 202 moved into interior 400 of fuselage 214.

In this illustrative example, radiation generation system 208 is configured to direct x-ray beam 310 towards surface 402 of fuselage 214. Surface 402 is an interior surface of fuselage 214. Backscatter 404 is formed in response to x-ray beam 310 encountering fuselage 214.

As depicted, shape 314 of detector system 210 has been changed such that shape 314 substantially conforms to surface shape 406 of surface 402 of fuselage 214. In particular, surface shape 406 of surface 402 has a concave shape with respect to radiation generation system 208. Structure 320 of detector system 210 has been bent at one or more flexible joints between plurality of segments 332 such that shape 314 of structure 320 has a concave shape with respect to radiation generation system 208 that is similar to the concave shape of surface 402 of fuselage 214.

In this manner, when shape 314 of detector system 210 substantially conforms to surface shape 406 of surface 402 of fuselage 214, the shape of scintillator 321 in turn substantially conforms to surface shape 406 of surface 402, and each portion of scintillator 321 may be placed more equidistantly from the shape 406 of the surface 402 of fuselage 214 relative to all other portions of scintillator 321. As a result, aberrations and pincushion effects from imaging are reduced or eliminated. Furthermore, detector system 210 and radiation generation system 208 in backscatter inspection system 202 may be moved closer to surface 402, particularly in more constrained or limited locations. As such, increased image contrast may be obtained by placing detector system 210 closer to surface 402 and increasing the amount of backscatter 404 captured and detected by detector system 210.

Although FIGS. 3 and 4 are described with reference scanning fuselage 214, it should be understood that detector system 210 may be implemented to scan any number of objects, or parts of objects, as previously described with reference to FIG. 1, such as pipes, storage tanks, aircraft wings, etc.

In existing systems, multiple sensor arrays may be implemented in detector system 210. For example, each segment may be associated with a separate sensor array, each sensor array including a scintillator and a light detector. As such, each sensor array would move along with the corresponding structure segment in shape 314. Although this may result in improved image contrast and detail by conforming the configuration of the sensor arrays to the shape of the object to be scanned, there are still potential gaps left open between sensor arrays since each sensor array is a separate structure from other sensor arrays. This may cause loss in detail, or require extrapolation of portions of the image by a computer system, which may not be accurate.

In contrast, the described systems utilized a scintillator comprising a single continuous structure which spans the entire dimension of structure 320. Therefore, scintillator 321 is able to capture all backscattered light rays within the given area of the scintillator. The flexible characteristics of scintillator 321 also allows for better geometrical configuration and more accurate imaging definition that is closer to the actual dimensions of the object being tested.

Furthermore, the structure of the optical fibers of scintillator 321 allows a single light detector to be implemented to measure all the light produced by scintillator 321 covering a given area. Furthermore, light detector may be positioned away from radiation generation system 208. This may be advantageous in situations where there is limited space in or around the object being scanned. Therefore, the described systems also provide for a detection system with fewer components, allowing for a less complex design and flexibility in configuration, which may result in reduced costs and increased operational efficiency. Placing the light detector away from the scintillator may also be advantageous in environments, such as Class I locations, in which flammable gases or vapors are or may be present in the air in quantities sufficient to produce explosive or ignitable mixtures. Such hazardous environments may require use of explosion-proof apparatus or devices. Thus, the risk of igniting flammable gases or vapors by sparks or flashes is reduced by placing the electrical components, such as the light detector, away from the hazardous environment.

The inclusion of multiple sensor arrays in existing systems also place limits on the size and configuration of such backscatter detectors. Because systems described herein require fewer sensor arrays that may be placed away from the structure of the detector system, a more flexible and maneuverable structure may be implemented to conform to surface shapes of objects having more complex surface shapes. Additionally, the size of flexible scintillators and structures may be reduced and implemented with the described systems in order to scan smaller objects and components, such as fuel tanks, piing, etc. The possible configurations of the structure are further described with reference to FIGS. 5A and 5B below.

Figure 5B:
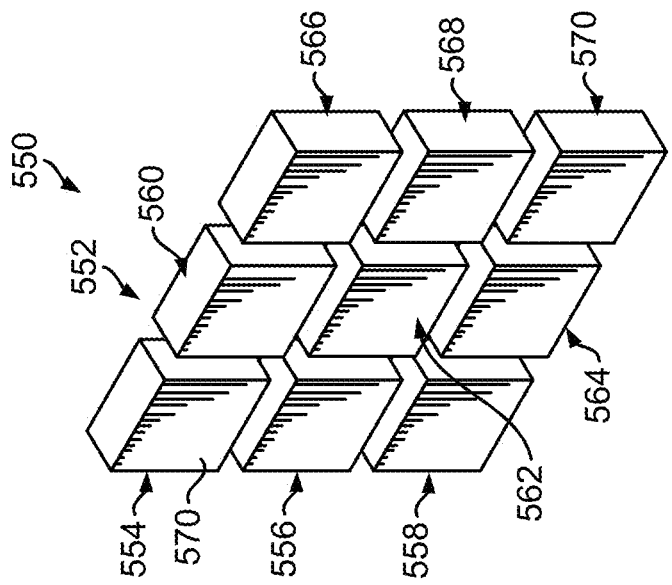
FIG. 5B is an illustration of a configurable structure of a detector system in accordance with an illustrative embodiment.
Figure 5A:
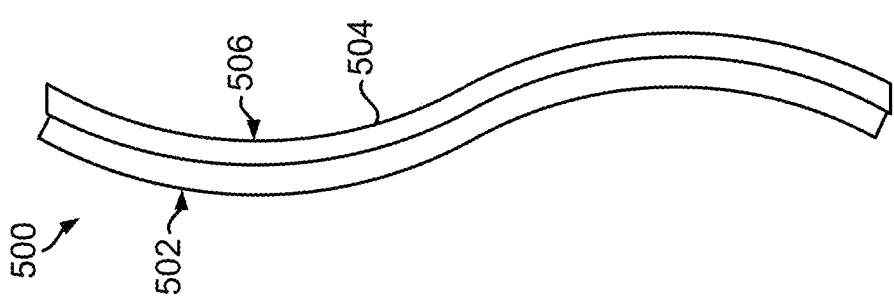
FIG. 5A is an illustration of a detector system in accordance with an illustrative embodiment.

With reference now to FIG. 5A, an illustration of a detector system is depicted in accordance with an illustrative embodiment. In this illustrative example, detector system 500 is an example of one implementation for detector system 114 in FIG. 1. As depicted, detector system 500 includes a sensor array 502 comprising a flexible scintillator panel associated with structure 504. Structure 504 takes the form of a deformable material in this example. Structure 504 is configured to be deformed such that structure 504 may have a desired shape. In this depicted example, structure 504 has wavy shape 506. As depicted in FIG. 5A, the configuration of structure 504 and sensor array 502 is shown in two dimensions. However, in various embodiments, the shape or form of described structures may be manipulated in three dimensions.

Turning now to FIG. 5B, an illustration of a configurable structure 550 in a detector system, such as structure 320 of detector system 210, in accordance with an illustrative embodiment. In this illustrative example, structure 550 comprises number of segments 552 arranged in three columns and three rows. Number of segments 552 includes segments 554, 556, 558, 560, 562, 564, 566, 568, and 570.

Each segment in number of segments 552 may be connected to each other through number of flexible joints allowing each segment to move relative to adjacent segments. As such, each segment may be able to move in multiple dimensions along each joint. This provides greater maneuverability in configuration of the shape of the structure to conform to the surface shape of various objects.

Each segment of the number of segments 552 includes a surface 570 upon which a flexible scintillator may attach or rest. It should be understood that the structure may include any number of segments in length or width. Although each segment depicted in FIG. 5B includes a relatively square surface 570, in various embodiments, segments may include surfaces with different geometric shapes, such as rectangular configurations, triangular configurations, circular configurations, etc. Additionally, the segments may be configured with various dimensions. In some embodiments, incorporating segments of different shapes and/or reducing the size of the segments may allow for finer granularity in the final shape configuration of structure 550.

Figure 6A:
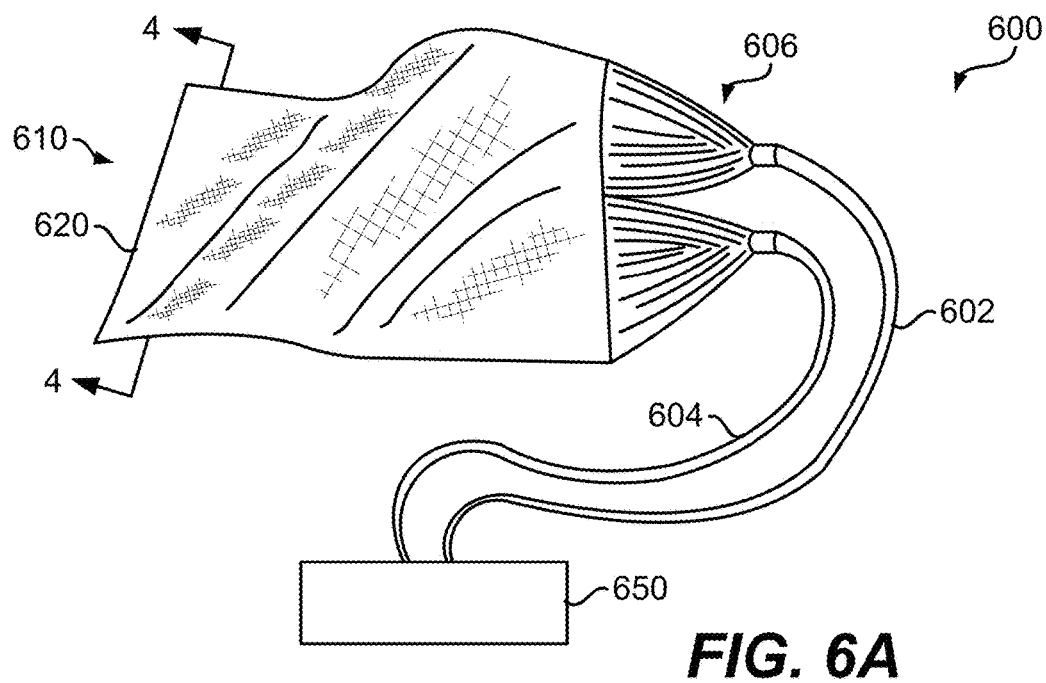
FIG. 6A is an illustration of a sensor array comprising a flexible scintillator panel, in accordance with an illustrative embodiment.

Various examples of configurations of optical fibers in a flexible scintillator are described with reference to FIGS. 6A, 6B, 6C, 6D, and 6E. With respect to FIG. 6A, shown is a sensor array 600 comprising a flexible scintillator panel 610, in accordance with one or more embodiments. In various embodiments, sensor array 600 is sensor array 312 and flexible scintillator 610 is scintillator 320, as previously described. As previously described, scintillator 610 may comprise a plurality of optical fibers 606. In some embodiments, optical fibers 606 are contained within semi-rigid casing 620. Optical fibers 606 may be further grouped into one or more bundles, such as bundles 602 and 604, as illustrated. In certain embodiments, the bundles of optical fibers may include approximately 50 to 500 optical fibers, depending on the thickness of optical fibers, which may range from approximately 0.1 to 5 millimeters. However, any number of optical fibers of appropriate size may be implemented in various embodiments. Such bundles may then be fed into light detector 650 which is configured to measure the amount of light generated by the scintillating fibers and transmitted through the fibers to light detector 650. For example, light detector 650 may be a photomultiplier tube (PMT) based on MEMS technology, as previously described. The ends of the optical fibers may be polished to reduce the light scattering at the end of fibers and increase the optical coupling efficiency of transmission of light into the light detector.

In various embodiments, the optical fibers may be organic fibers comprising carbon-based material, such as polyvinyl. The optical fibers may be manufactured from other plastic materials, including Poly(methyl methacrylate) (PMMA) and other fluorinated polymers. In some embodiments, the optical fibers may comprise glass optical fibers made from silica, or other materials, such as fluorozirconate, fluoroaluminate, and chalcogenide glasses, as well as crystalline materials like sapphire. The material selected for the optical fibers may depend on the desired configuration characteristics of the flexible scintillator, such as refractive indices or amount of flexibility for example. In various embodiments, scintillating material, such as inorganic crystals, may be injected into the plastic or other material during manufacturing.

Figure 6B:
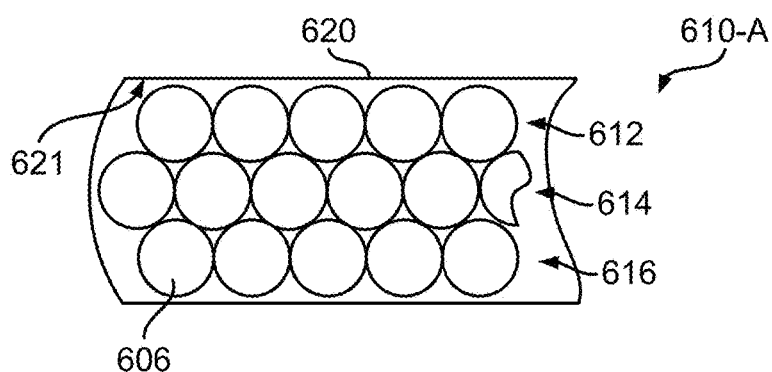
FIGS. 6B, 6C, 6D, and 6E illustrate example configurations of optical fibers in a flexible scintillator panel, in accordance with one or more embodiments.

In one example embodiment, the optical fibers may be stacked in layers, as shown in the configuration of scintillator 610-A in FIG. 6B, in accordance with one or more embodiments. Scintillator 610-A may be an example embodiment of a portion of scintillator 610. A transverse cross-section of scintillator 610-A, such as that taken along line 4-4, is illustrated in FIG. 6B showing three layers of optical fibers 606, including layers 612, 614, and 616. In some embodiments, scintillator 610 may include as fewer or more layers of optical fibers than depicted in FIG. 6B. As illustrated, the layers of optical fibers may be offset, such that an optical fiber in one layer is offset from another optical fiber in an adjacent layer. For example, an optical fiber may be positioned in between two other optical fibers in an adjacent layer. However, in some embodiments, the optical fibers may be stacked in line with optical fibers in adjacent layers. In some embodiments, the optical fibers may be joined or coupled to one or more adjacent optical fibers to maintain the structure of scintillator 610 or restrict relative movement of the optical fibers. For example, optical fibers in a single layer may be coupled to adjacent optical fibers in the same layer. In some embodiments, layers of optical fibers may further be coupled to other adjacent layers. For example, the optical fibers in layer 612 may be coupled to adjacent optical fibers in layer 614.

In various embodiments, the optical fibers are encased in casing 620. Casing 620 may comprise a transparent semi-rigid material, such as silicone or plastics. In some embodiments, casing 620 serves to contain and maintain the structure for the layers optical fibers while allowing flexible movement and configuration. In some embodiments, one or more optical fibers may be attached or adhered to the inner surface of casing 620. This may prevent significant movement between the optical fibers and the casing, as well as provide more structural support for the scintillator. For example, layer 612 may be coupled to inner surface 621 of casing 620.

Figure 6C:
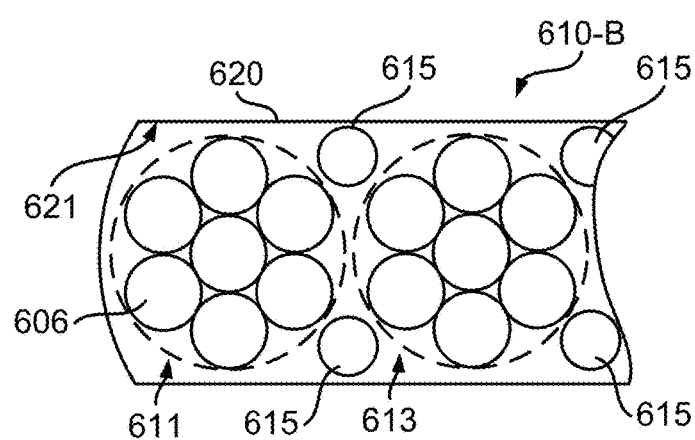

FIG. 6C illustrates another example configuration of optical fibers within a scintillator 610-B. FIG. 6C illustrates another embodiment of a cross-section of a portion of scintillator 610 taken along line 4-4. As shown with respect to scintillator 610-B, in some embodiments, the optical fibers in a layer may be grouped into clusters within casing 620. Such clusters within a casing may be referred to herein as "encased clusteres." Clusters 611 and 613 are depicted in FIG. 6C by dashed lines, each cluster with six optical fibers. In some embodiments, each cluster within casing 620 may include additional or fewer individual optical fibers. For example, optical fibers may be grouped into clusters of three optical fibers. Encased clusters may be grouped together by adhesives, tied together by strips of materials, or other mechanical means. In some embodiments, adjacent clusters may additionally be coupled together. In some embodiments, the clusters of fibers within casing 620 may be coupled to interior surface 621 of casing 620. Although encased clusters 611 and 613 are illustrated side-by-side, additional clusters in other layers may be positioned above or below clusters 611 and 613 within casing 620.

In some embodiments, one or more individual optical fibers may be placed around encased clusters 611 and 613. For example, individual optical fibers 615 are shown in FIG. 6C. In various embodiments, individual optical fibers 615 may also be attached or coupled to one or more of the encased clusters, such as 611 or 613. In various embodiments, bundles of optical fibers (shown in FIG. 6C) may be combined with layers of optical fibers (shown in FIG. 6B) or other configurations of optical fibers within casing 620.

Casing 620 may further be configured to be an attachment surface for attaching to the surface to a flexible structure, such as surfaces 570 of segments 552 of structure 550. In some embodiments, casing 620 may attach to segment surfaces via adhesives or other mechanical means, including hooks, hook-and-loop fasteners such as VELCRO, snaps, buttons, inserts, flexible adhesives and tapes, etc.

Figure 6D:
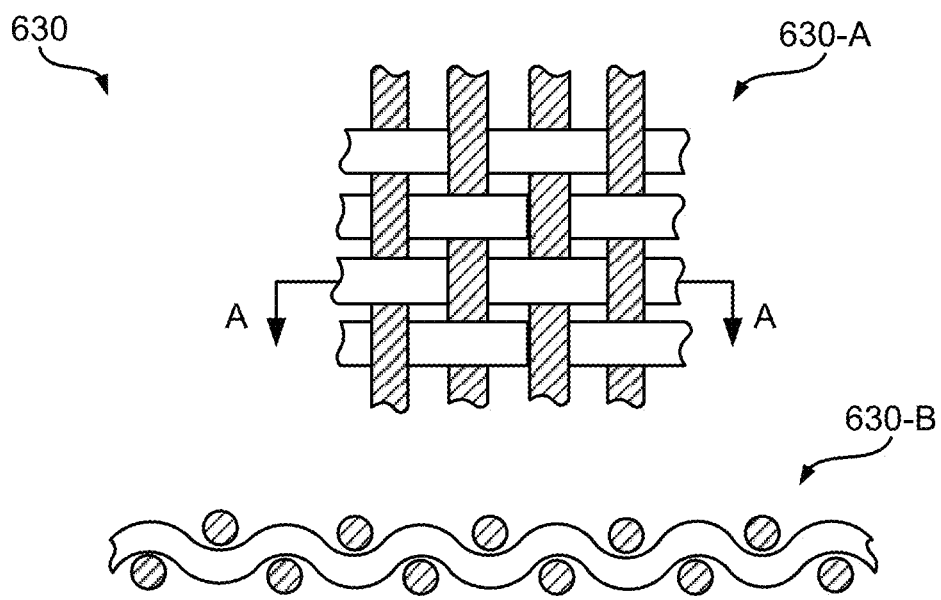
Figure 6E:
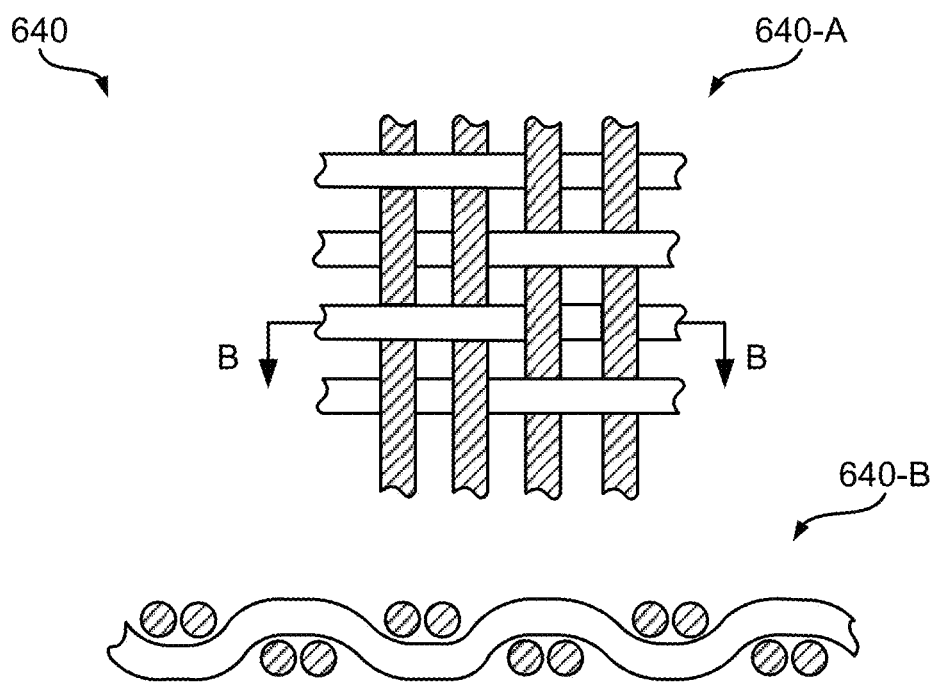

FIGS. 6D and 6E illustrate examples of alternative configurations of the optical fibers within a casing of a flexible scintillator. In various embodiments, optical fibers within a layer of optical fibers may be configured in a woven or interwoven configuration or arrangement for greater structural cohesion or stability. FIG. 6D illustrates a portion of a layer 630 of optical fibers configured in a plain weave configuration from a surface view 630-A and a cross-sectional view 630-B taken along line A-A. FIG. 6E illustrates a portion of layer 640 of optical fibers configured in a rib weave configuration from a surface view 640-A and a cross-sectional view 640-B taken along line B-B. In various embodiments, layers may be configured in any one of other known weave configurations or patterns, including basket weave, twill weaves, etc. In addition to biaxial weave configurations, the optical fibers may be configured in various triaxial weave configurations or multi-ply weave configurations. Various weave configurations may be chosen based on desired structural characteristics provided by a particular weave configuration. Various weave configurations may also be chosen based on structural characteristics or limitations of the optical fibers. Because a woven configuration of optical fiber layers provide greater structural integrity, some embodiments implementing a woven configuration of optical fibers in one or more layers may not contain the layers within a semi-rigid casing, such as casing 620.

Including multiple layers of optical fibers, through layering or in-casing bundles as presented in the described embodiments may allow for greater sensitivity in light detection and improved contrast and/or sharpness. First, using more optical fibers increases the probability of backscatter photon absorption, particularly photons with higher energy and photons contacting the scintillator with increased angles of incidence. As such, image contrast may increase with the increased amount of backscatter photons captured and detected. Additionally, backscatter photons of higher energy may excite a larger number of optical fibers in various layers or bundles. By providing multiple layers of optical fibers more granularity in scintillation may be created as stronger backscattering illuminates additional fibers positioned further away from the object. This in turn may allow for more detail in the final image. A scintillator with greater sensitivity to photon energy may require less X-ray energy to be emitted from the radiation source, which results in less radiation and wattage, which decrease exponentially. Furthermore, less shielding is required from the radiation, and less cooling is needed for the components. Overall, the described systems may result in less power consumption and materials used, significant cost savings, and increase in safety.

Figure 7:
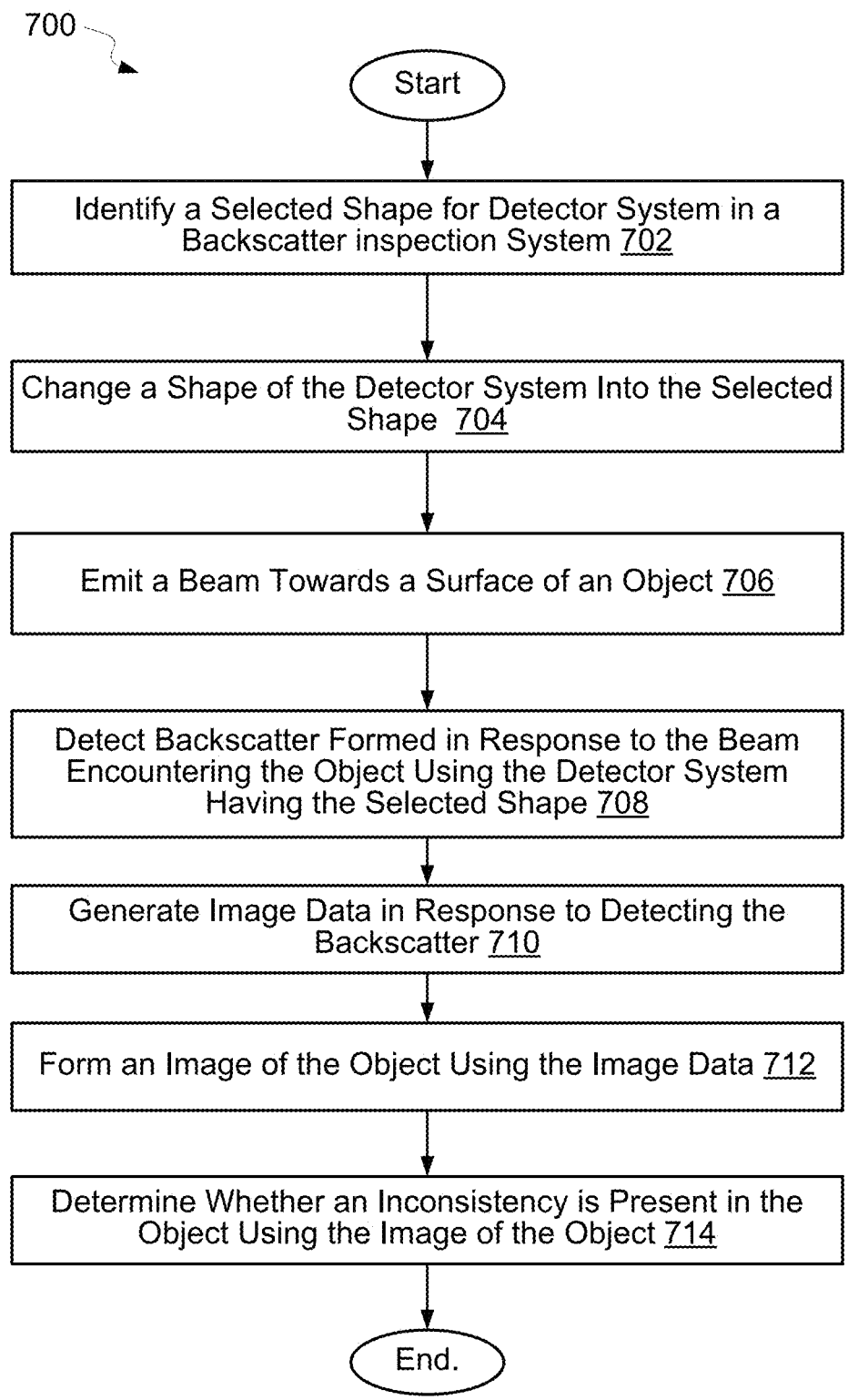
FIG. 7 is an illustration of a process for inspecting an object, in the form of a flowchart, in accordance with an illustrative embodiment.

With reference now to FIG. 7, an illustration of process 700 for inspecting an object, in the form of a flowchart, is depicted in accordance with an illustrative embodiment. The process illustrated in FIG. 7 may be used to inspect an object, such as object 104 in FIG. 1. This process may be implemented using, for example, without limitation, backscatter inspection system 102 in FIG. 1.

The process begins by identifying a selected shape for a detector system in a backscatter inspection system (operation 702). In operation 702, the detector system may be detector system 114 in FIG. 1. The process then changes a shape of the detector system into the selected shape (operation 704). In operation 704, the shape of the detector system may be changed in a number of different ways using a structure in the detector system. The structure may be, for example, structure 144 in FIG. 1.

When the structure is a plurality of segments connected to each other by a number of flexible joints, operation 704 may be performed by moving at least one of the segments in the plurality of segments relative to another segment in the plurality of segments about a flexible joint in the number of flexible joints. When the structure is a deformable material, operation 704 may be performed by deforming the deformable material.

Further, when the structure is a flexible circuit, operation 704 may be performed by sending commands to the flexible circuit to cause a configuration of the flexible circuit to change. Changing the configuration of the flexible circuit may change the shape of the detector system.

Thereafter, the process emits a beam towards a surface of an object (operation 706). The beam is formed using a portion of radiation emitted from a radiation source in the backscatter inspection system. Next, the process detects backscatter formed in response to the beam encountering the object using the detector system having the selected shape (operation 708). The backscatter may be formed in response to at least a portion of the beam being scattered when the beam encounters the surface of the object and/or the subsurface of the object.

The process generates image data in response to detecting the backscatter (operation 710). The process then forms an image of the object using the image data (operation 712). The process then determines whether an inconsistency is present in the object using the image of the object (operation 714), with the process terminating thereafter.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the different illustrative embodiments provide a method and apparatus for inspecting an object. In one illustrative embodiment, an apparatus comprises a radiation source, a collimator, and a detector system. The radiation source is configured to emit radiation. The collimator is configured to form a beam using a portion of the radiation emitted by the radiation source. The beam is directed towards a surface of an object. The detector system is configured to detect backscatter formed in response to the beam encountering the object. A shape of the detector system is configured to be changed into a selected shape.

The different illustrative embodiments provide a detector system that allows a smaller radiation source to be used in a backscatter inspection system. Further, with a detector system that includes fewer electronic and/or mechanical components and has a shape that is reconfigurable, the size of the overall backscatter inspection system may be reduced. Still further, using light detectors based on micro-electro-mechanical systems technology in a detector system may reduce the cost of the detector system as compared to currently available detector systems.

Aircraft Examples

Figure 8:
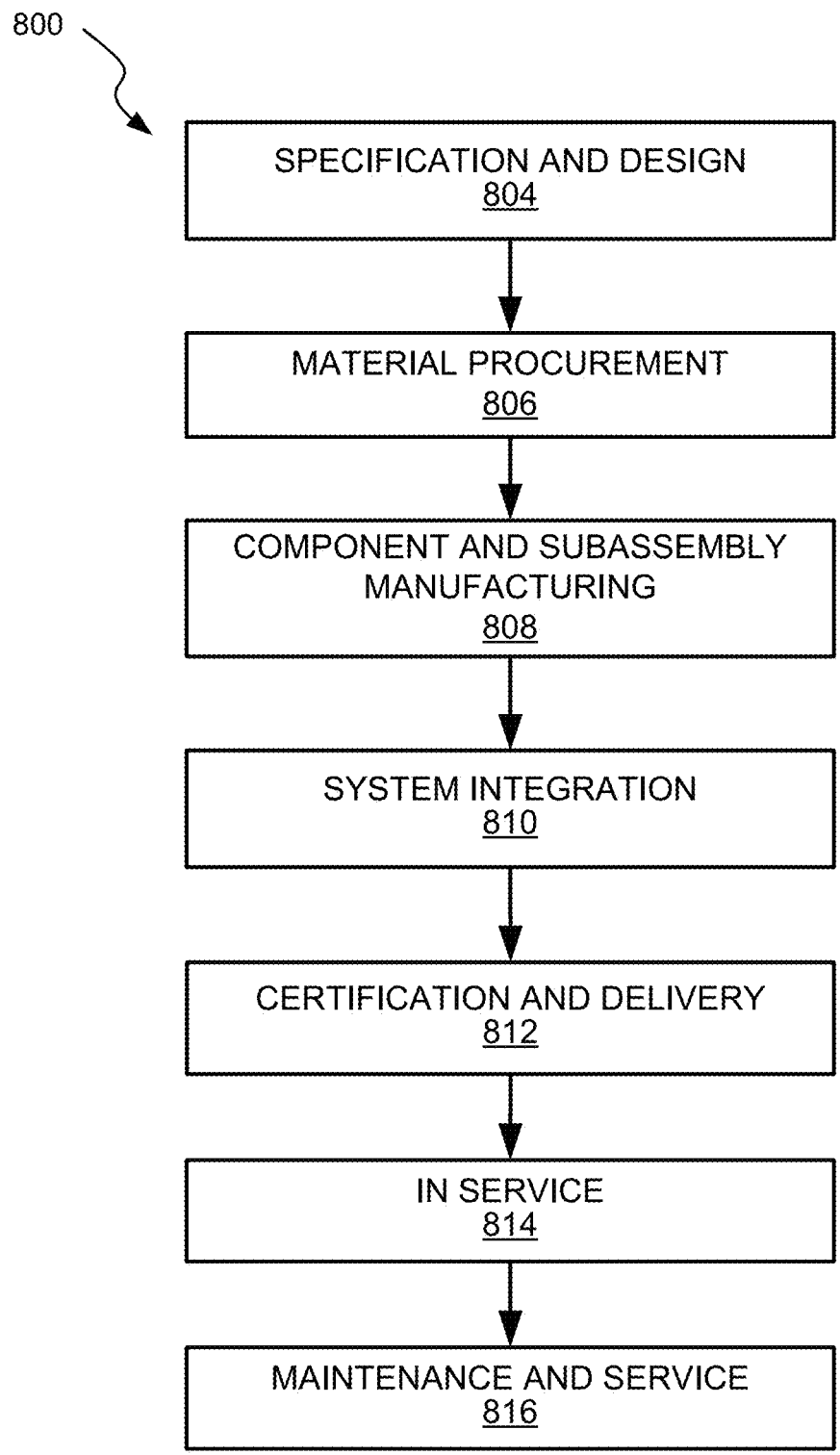
FIG. 8 is a block diagram of aircraft production and service methodology that may utilize methods and assemblies described herein.

Examples of the present disclosure may be described in the context of aircraft 204 as shown in FIG. 2 and aircraft manufacturing and service method 800 as shown in FIG. 8. As previously described, FIG. 2 is a schematic illustration of an aircraft 204 in an inspection environment 200 which may comprise various components or structures that may be inspected using the systems and methods described herein. As depicted in FIG. 2, aircraft 204 comprises fuselage 214 with wings 220. Aircraft 204 may also include engines 230 supported by wings 220. Although an aerospace example is shown, the principles disclosed herein may be applied to other industries, such as the automotive industry. Accordingly, in addition to aircraft 204, the principles disclosed herein may apply to other vehicles, e.g., land vehicles, marine vehicles, space vehicles, etc.

FIG. 8 is a block diagram of aircraft production and service methodology that may utilize methods and assemblies described herein. During pre-production, illustrative method 800 may include specification and design (block 804) of aircraft 204 and material procurement (block 806). During production, component and subassembly manufacturing (block 808) and inspection system integration (block 810) of aircraft 204 may take place. Described apparatus, and corresponding methods of operation, may be implemented in any of specification and design (block 804) of aircraft 204, material procurement (block 806), component and subassembly manufacturing (block 808), and/or inspection system integration (block 810) of aircraft 204.

Thereafter, aircraft 700 may go through certification and delivery (block 812) to be placed in service (block 814). While in service, aircraft 700 may be scheduled for routine maintenance and service (block 816). Routine maintenance and service may include modification, reconfiguration, refurbishment, etc. of one or more inspection systems of aircraft 204. Described apparatus, and corresponding methods of operation, may be implemented in any of certification and delivery (block 812), service (block 814), and/or routine maintenance and service (block 816).

Each of the processes of illustrative method 800 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers, and an operator may be an airline, leasing company, military entity, service organization, and so on.

CONCLUSION

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure.

While the present disclosure has been particularly shown and described with reference to specific embodiments thereof, it will be understood by those skilled in the art that changes in the form and details of the disclosed embodiments may be made without departing from the spirit or scope of the present disclosure. The description of the different illustrative embodiments has been presented for purposes of illustration and description, and is not intended to be exhaustive or limited to the embodiments in the form disclosed. Many modifications and variations will be apparent to those of ordinary skill in the art. It is therefore intended that the present disclosure be interpreted to include all variations and equivalents that fall within the true spirit and scope of the present disclosure. Accordingly, the present examples are to be considered as illustrative and not restrictive.

Although many of the components and processes are described above in the singular for convenience, it will be appreciated by one of skill in the art that multiple components and repeated processes can also be used to practice the techniques of the present disclosure.

What is claimed is:

1. An apparatus for detecting backscatter comprising:
   a structure including a shape, wherein the shape is configured to change from a first shape to a second shape that is non-planar; and
   a sensor array comprising a flexible panel, the flexible panel comprising a plurality of first scintillating optical fibers arranged in a plurality of clusters within a semi-rigid casing, each cluster comprising a grouping of multiple first scintillating optical fibers joined together, wherein the flexible panel further comprises a plurality of second scintillating optical fibers individually positioned between the plurality of clusters within the semi-rigid casing;
   wherein the flexible panel is coupled to a surface of the structure such that the flexible panel conforms to the shape of the structure from the first shape to the second shape; and
   wherein the sensor array is configured to detect backscatter of a radiation beam formed in response to the radiation beam contacting an object.

2. The apparatus of claim 1, wherein each of the plurality of first scintillating optical fibers and each of the plurality of second scintillating optical fibers is coupled to a light detector configured to measure a total amount of scintillation produced by the plurality of first scintillating optical fibers and the plurality of second scintillating optical fibers from the backscatter.

3. The apparatus of claim 2,
wherein the total amount of scintillation is used to determine an intensity value for a pixel in an image of the object corresponding to a location of the object contacted by the radiation beam.

4. The apparatus of claim 1, wherein the semi-rigid casing allows flexible movement of the plurality of scintillating first optical fibers and the plurality of second scintillating optical fibers to conform to the second shape of the structure.

5. The apparatus of claim 1, wherein the plurality of clusters are arranged in one or more layers within the semi-rigid casing.

6. The apparatus of claim 1, wherein the flexible panel further comprises a plurality of third scintillating optical fibers arranged in one or more layers, wherein the plurality of third scintillating optical fibers within a first layer of the one or more layers are arranged in an interwoven configuration.

7. The apparatus of claim 1, wherein the structure comprises a plurality of segments connected to each other by a number of flexible joints, wherein movement of at least one segment in the plurality of segments relative to another segment in the plurality of segments about a flexible joint of the number of flexible joints changes the shape of the structure.

8. The apparatus of claim 7, wherein the shape of the structure is configured to change in three dimensions.

9. The apparatus of claim 1, wherein the structure comprises: a deformable material, wherein deformation of the deformable material changes the shape of the structure.

10. The apparatus of claim 1,
wherein the second shape of the structure substantially corresponds to a substantially non-planar shape of a surface of the object,
wherein the first shape of the structure and the second shape of the structure are different, and
wherein the second shape of the structure is a selected shape of the apparatus.

11. The apparatus of claim 10, further comprising an electromechanical system configured to repeatedly reconfigure the structure as a moveable platform moves the apparatus relative to the object;
wherein the moveable platform is associated with the apparatus;
wherein the electromechanical system repeatedly reconfigures the structure using data from the sensor array; and
wherein the electromechanical system repeatedly reconfigures the structure such that the shape of the structure changes to substantially conform to the substantially non-planar shape of the surface of the object.

12. The apparatus of claim 11, further comprising:
a radiation source configured to emit radiation, wherein the radiation comprises x-rays configured to at least partially penetrate the object; and
a collimator configured to form the radiation beam using a portion of the radiation emitted by the radiation source, wherein the radiation beam is directed towards a surface of the object.

13. A backscatter x-ray system comprising:
an x-ray tube configured to emit x-rays;
a collimator configured to form an x-ray beam using a portion of the x-rays emitted by the x-ray tube, wherein the x-ray beam is directed towards a surface of an object; and
a detector system configured to detect backscatter of the x-ray beam formed in response to the x-ray beam contacting the object, the detector system comprising:
a structure including a shape, wherein the shape is configured to change from a first shape to a second shape that is non-planar, and
a sensor array comprising a flexible panel, the flexible panel comprising a plurality of first scintillating optical fibers arranged in a plurality of clusters within a semi-rigid casing, each cluster comprising a grouping of multiple first scintillating optical fibers joined together,
wherein the flexible panel further comprises a plurality of second scintillating optical fibers individually positioned between the plurality of clusters within the semi-rigid casing, and
wherein the flexible panel is coupled to a surface of the structure such that the flexible panel conforms to the shape of the structure from the first shape to the second shape.

14. The backscatter x-ray system of claim 13,
wherein each of the plurality of first scintillating optical fibers and each of the plurality of second scintillating optical fibers is coupled to a light detector configured to measure a total amount of scintillation produced by the plurality of first scintillating optical fibers and the plurality of second scintillating optical fibers from the backscatter;
wherein the total amount of scintillation is used to determine an intensity value for a pixel in an image of the object corresponding to a location of the object contacted by the radiation beam.

15. The backscatter x-ray system of claim 13, wherein the plurality of clusters are arranged in one or more layers within the semi-rigid casing.

16. A method for inspecting an object, the method comprising:
identifying a selected shape for a detector system in a backscatter inspection system, wherein the selected shape comprises a substantially non-planar shape corresponding to a surface of the object;
changing a shape of the detector system from a first shape t the selected shape using a structure of the detector system, the detector system comprising a sensor array configured to detect backscatter,
wherein the sensor array comprises a flexible panel, the flexible panel comprising a plurality of first scintillating optical fibers arranged in a plurality of clusters within a semi-rigid casing, each cluster comprising a grouping of multiple first scintillating optical fibers joined together,
wherein the flexible panel further comprises a plurality of second scintillating optical fibers individually positioned between the plurality of clusters within the semi-rigid casing, and
wherein the flexible panel is coupled to a surface of the structure such that the flexible panel conforms to the shape of the detector system from the first shape to the selected shape;
emitting a radiation beam towards the surface of the object, wherein the radiation beam is formed using a portion of radiation emitted from a radiation source, wherein the radiation comprises x-rays configured to at least partially penetrate the object; and detecting backscatter formed in response to the radiation beam ene ag contacting the object using the detector system having the selected shape.

17. The method of claim 16, wherein the sensor array further comprises a light detector coupled to each of the plurality of first scintillating optical fibers and each of the plurality of second scintillating optical fibers; and wherein the method further comprises:

transmitting light produced by scintillation of the plurality of first scintillating optical fibers and the plurality of second scintillating optical fibers from the backscatter to the light detector, and measuring a total amount of transmitted light to determine an intensity value for a pixel in an image of the object corresponding to the location of the object contacted by the radiation beam.

18. The method of claim 16, wherein the structure comprises a plurality of segments connected to each other by a number of flexible joints, wherein movement of at least one segment in the plurality of segments relative to another segment in the plurality of segments about a flexible joint of the number of flexible joints changes the shape of the structure.

19. The method of claim 16, further comprising:

repeatedly reconfiguring the structure as a moveable platform moves relative to the object using an electro-mechanical system;

wherein the moveable platform is associated with the detector system;

wherein the step of repeatedly reconfiguring the structure uses data from the sensor array; and wherein the step of repeatedly reconfiguring the structure changes the shape of the detector system to substantially conform to the substantially non-planar shape of the surface of the object.

20. The method of claim 16, wherein the plurality of clusters are arranged in one or more layers within the semi-rigid casing.

* * * * *

UNITED STATES PATENT AND TRADEMARK OFFICE
CERTIFICATE OF CORRECTION

PATENT NO. : 11,112,370 B2
APPLICATION NO. : 16/240613
DATED : September 7, 2021
INVENTOR(S) : Morteza Safai Page 1 of 1

It is certified that error appears in the above-identified patent and that said Letters Patent is hereby corrected as shown below:

In the Claims

Column 22, Lines 47-49, please change:
"changing a shape of the detector system from a first shape t the selected shape using a structure of the detector system,"

To:
-- changing a shape of the detector system from a first shape to the selected shape using a structure of the detector system, --.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*